United States Patent [19]

Haaland

[11] 4,170,365

[45] Oct. 9, 1979

[54] GASKET OF RUBBER OR A SIMILAR MATERIAL

[75] Inventor: Per Haaland, Oslo, Norway

[73] Assignee: A/S Den Norske Remfabrik, Kolbotn, Norway

[21] Appl. No.: 883,615

[22] Filed: Feb. 22, 1978

[30] Foreign Application Priority Data

Feb. 25, 1977 [NO] Norway .................................. 770644

[51] Int. Cl.² ...................... F16L 49/00; F16L 17/02; F16J 15/10
[52] U.S. Cl. ................................ 277/207 A; 277/215; 285/230; 285/231
[58] Field of Search ............ 277/DIG. 2, 207 A, 215; 285/230, 231, 345, 369

[56] References Cited

U.S. PATENT DOCUMENTS

| | | | |
|---|---|---|---|
| 1,608,197 | 11/1926 | Bille | 277/207 A X |
| 2,032,492 | 3/1936 | Nathan | 285/231 X |
| 2,209,235 | 7/1940 | Nathan | 277/207 A X |
| 2,259,940 | 10/1941 | Nathan | 277/207 A X |
| 2,615,741 | 10/1952 | Nathan | 277/207 A X |
| 2,936,187 | 5/1960 | Peterson | 277/72 X |
| 3,046,028 | 7/1962 | Nathan | 277/207 A X |
| 3,107,922 | 10/1963 | Nathan | 277/207 A X |
| 3,334,928 | 8/1967 | Schmunk | 285/236 X |
| 3,430,989 | 3/1969 | Wendt | 277/207 A X |
| 3,575,430 | 4/1971 | Alpine | 277/207 A X |

Primary Examiner—Robert S. Ward, Jr.
Attorney, Agent, or Firm—William Anthony Drucker

[57] ABSTRACT

A gasket of rubber or a similar material for sealing joints between the sealing surfaces of two members to be joined, for example pipe sections comprising a spigot and a socket part. The gasket is placed in a fixed position on the sealing surface of one of the members, and for assembly of the members the sealing surfaces of both members are displaced substantially parallel to each other for squeezing the gasket therebetween due to displacement of portions of the gasket relative to other gasket portions. The gasket portions which during the installation of the members are displaced relative to each other define one or more closed very narrow slits extending in the longitudinal direction of the gasket. The width of the slits is so small that the said gasket portions while being displaced during the installation are constantly in contact and slide along each other. Further, the slits between the said portions of the gasket are so arranged that the said portions are displaced relative to each other during the installation without being bent, whereas the width of the gasket is reduced. When the said portions are displaced along each other in the opposite direction they become clenched and offer a large resistance to the displacement and produce a large packing pressure.

10 Claims, 6 Drawing Figures

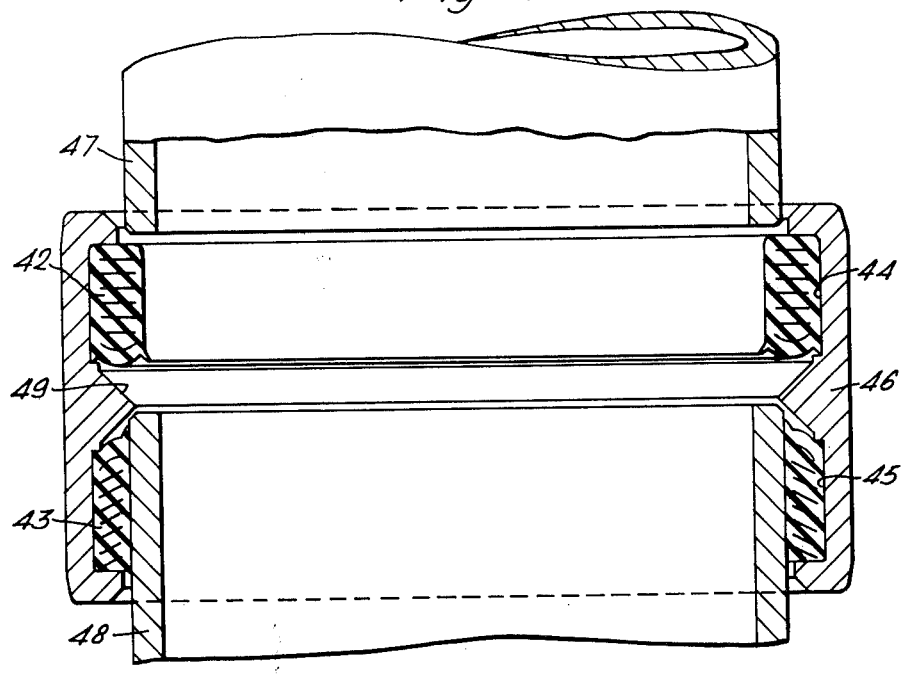
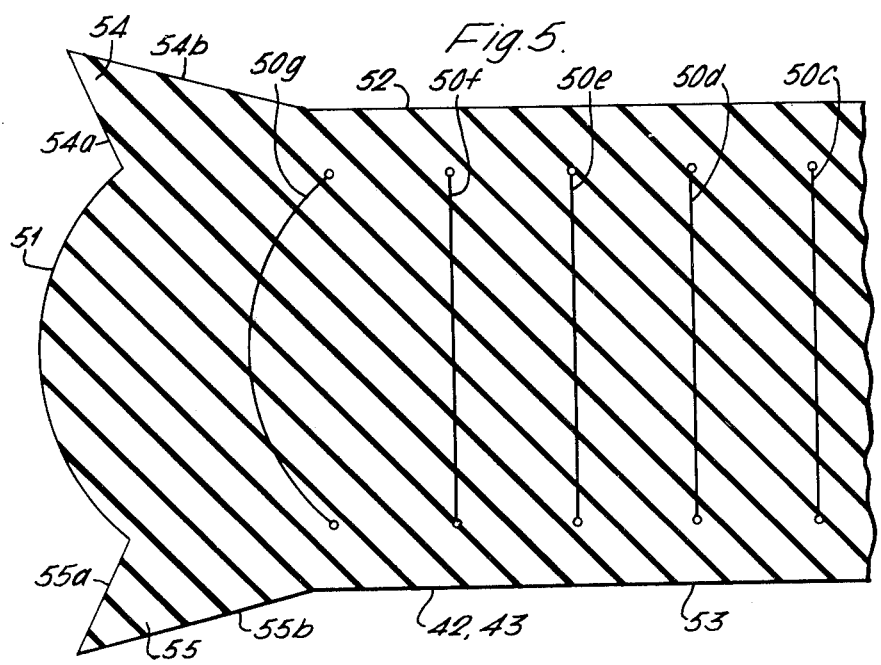

GASKET OF RUBBER OR A SIMILAR MATERIAL

BACKGROUND OF THE INVENTION

1. Field of the Invention

The present invention relates to a gasket of rubber or a similar material for sealing joints between the sealing surfaces of two members to be joined, for example pipe sections comprising a spigot and a socket part, the gasket being placed in a fixed position on the sealing surface of one of the members and the sealing surfaces of the members being displaced substantially parallel to each other for squeezing the gasket therebetween due to displacement of portions of the gasket relative to other gasket portions.

2. Statement of the Prior Art

When joining basin rings and similar members having a spigot and a socket end rolling sealing rings are extensively used. During the joining of the members the sealing rings roll along substantially coaxial sealing surfaces and are compressed therebetween.

A disadvantage in connection with this sealing method consists in that the rolling sealing rings may roll non-uniformly during the joining operation, which implies that the ring may take an oblique position in the sealing area when the joining operation has been completed. Such an oblique position of the rolling sealing gasket may result in a leakage in the joint area.

To remedy this difficulty there have been manufactured gaskets which are placed in their final position on the spigot end of a first member. Subsequent to the positioning of the gasket on the first member the socket end of the next member on which a lubrication means has been applied, is pushed onto the spigot end of the first member and thereby onto the gasket thereof, the sealing surface of the socket end sliding along the gasket to its final position.

However, this sealing method is encumbered with the problem that in order to reduce the friction between the gasket and the member the external sliding surfaces must be provided with substantial amounts of a suitable lubrication means. This is especially true in connection with concrete products, the sliding surfaces of the socket end being non-uniform and rough, so that relatively large pores and cavities must be filled with the lubrication means. However, on the installation site the surfaces covered with the lubrication means may easily attract dust and sand particles, a fact which contributes to a reduction of the sliding properties and may cause damage to the gaskets. Further, the lubrication means may easily be washed away subsequent to the installation with leakage as a result. Besides, due to the tolerances which are unavoidable in connection with concrete pipes the socket parts may easily break as a consequence of too high a gasket pressure.

From U.S. Pat. No. 3,510,140 there is known an annular gasket having a V-shaped cross section, one leg of which is adapted to be placed around the spigot end of a first pipe. The free end of the other leg is bead-shaped, and between the two legs there is defined a wedge-shaped pocket adapted to hold a lubrication or sliding means. Whilst mounting the socket end of a second pipe on the spigot end of the first pipe the socket end will push the outer leg of the gasket to its final sealing position, the lubrication means facilitating the displacement between the gasket parts.

Such a gasket will solve the problem of exposed sliding surface portions and contribute to a comparatively easy installation of the parts to be joined. However, the installed parts may also easily be taken apart since the gasket scarcely offers larger resistance when the jointing members are subjected to forces seeking to force them apart.

From U.S. Pat. No. 2,032,492 there are known pipe joint assemblies comprising a rubber sealing ring having at its radially inner and outer faces a plurality of circumferentially extending ridges and circumferentially extending apertures formed in the rubber body. The ridges are flexed in the proper axial direction by which the resistance to the assembly movement is the lesser, and their resistance to pipe movement in the opposite axial direction is the greater by virtue of their tendency under the frictional drag to be swung more tightly against the pipe wall. However, this known sealing ring can only be used in connection with pipes of comparatively weak material, such as terra cotta or other ceramic material, the grooves between the ridges being sufficiently wide to permit considerable flexure of the ridges and each ridge preferably being generously wide at its base so as to make available ample resilience of the rubber for effectively sealing by flexure of the ridges, but without such radial compression of the ring body as might set up a pressure too great for the fragile material of the pipes.

According to this patent specification it is desirable to have a gasket which is very softly resilient so as to be adaptable effectively to annular spaces of varying radial depths. To increase the softness of the rubber sealing ring this is provided with circumferentially extending apertures formed in the rubber body as the zones where it would otherwise present the greatest resistance to radial compression, that is to say in the zones of the ridges. In other words U.S. Pat. No. 2,032,492 gives directions for a gasket which easily may have its cross section altered, the joining force between the pipe ends to be assembled being provided by external circumferentially extending flanges.

However, the reduction of the cross section which is provided by the gasket according to U.S. Pat. No. 2,032,492 is brought about by the material between the passages or the apertures being forced thereinto whilst the gasket material is subjected to bending. Because the gasket material is bent, it will have a poor sealing effect since the force from a bent elastic portion far from gives the same sealing effect as the force from a portion which is only clenched together without being bent. Accordingly, the known gasket will give a poor sealing effect at higher pressures, and the bent soft and elastic flanges on the outside of the gasket will at least in the embodiment illustrated in FIG. 10, hardly change this unfavourable condition. In the embodiment illustrated in FIGS. 4 and 5 of this Patent Specification the above adverse condition is somewhat improved, but this embodiment is limited to having the gasket mounted in a socket section prior to the pushing of a pipe spigot end thereinto.

In U.S. Pat. No. 3,575,430 there is disclosed a packing ring having an irregular cross section profile and being provided with a series of passages which are open in unmounted condition of the ring, but which during installation are closed by compression, the ring material then being sent into the passages whilst forming S-shaped curves. However, the function of the passages in the ring material is to provide a compression of the ring in an inner track in a sleeve which embraces the two spigot ends of two pipes to be jointed, and to obtain a further compression of the body of the ring the ring body is further cut away at one edge so that this edge of the ring is formed with a curved surface providing more space within the annular channel of the socket part to accommodate ring compression.

SUMMARY OF THE INVENTION

The chief objects of the invention are to provide a gasket which besides having the positive properties of the known sealing rings also has improved sealing and locking properties, the need of a lubrication means on the portions of the gasket which are shifted relative to each other, being reduced to a minimum. Further, an object of the invention is to give directions for a gasket which does not have to be received in a channel or groove in a sleeve or socket part to achieve its favourable sealing and locking properties, and which has a simple construction. The improvement of the present gasket is to the effect that the gasket portions which are displaced relative to each other, define one or more closed very narrow slits extending in the longitudinal direction of the gasket, the distance between the walls defining the slits being so small that the mentioned portions whilst being displaced during the assembly of the members are all the time in contact with and slide along each other, and that the slits between the mentioned portions are so shaped that the portions are displaced relative to each other during the assembly of the members for reducing the width of the gasket but without being bent, so that the mentioned portions when being displaced along each other in opposite direction of the installation direction, are clenched and offer a large resistance to the displacement and produces a large packing pressure.

By the present invention there is provided a gasket which does not have to be placed in a cavity in a sleeve or socket member, and the slits or splits which are formed in the gasket, have as their main object to provide a sliding movement between the closely arranged gasket portions or lamellae. In an embodiment wherein the narrow slits form lamellae therebetween the lamellae are, when the members to be joined are assembled, allowed to slide against each other whilst the narrow spaces between the lamellae remain substantially unchanged. The lamellae will then both in unmounted and mounted position of the gasket be in contact with each other and the reduction of the thickness of the gasket during the installation takes place by an alteration of the angular position of the lamellae, the lamellae maintaining their straight, unbended relation to each other. Upon a movement in the opposite direction to the installation direction the lamellae will stiffen each other for thereby having to be clenched before turning over their horizontal position, i.e. the position in which they rest in unmounted condition, the close relation of the lamellae rendering no possibility of the lamellae to be bent into the spaces therebetween. By the present invention there is thus achieved a gasket which compared with known sealing rings has a simpler construction, but nevertheless has a larger locking property and renders a larger sealing pressure.

In another embodiment of the invention the gasket takes the form of a drop or diamond having a thickness or radial width which is larger than the width of the joint between the sealing surfaces of the members to be joined, and the slit is a narrow split-shaped passage, the walls of which are so inclined relative to the mounting direction of the members that the thickness of the gasket is easily reduced as a result of the sliding of the gasket portions along each other when the gasket is entrained by the member which is displaced relative to the member on which the gasket is located, so that the gasket upon displacement of the members in opposite direction to the installation direction seeks to regain its original thickness whilst the gasket portions are clenched.

The gasket according to the invention can easily be manufactured from extruded long strings which may be cut in suitable lengths and thereafter possibly welded or vulcanized at the ends for the forming of rings of suitable sizes. If desired, the gasket may be moulded. The way in which the gasket is produced depends upon the shape of the inner spaces or slits of the gasket.

The gasket according to the invention can be used in all joints where the sealing surfaces are to be displaced substantially parallel to each other. Although the gaskets usually will have an annular shape and are used in connection with the joining of pipes, basin rings or similar, they can also be used for other purposes, for example as hatchway gaskets.

Due to its simple geometric shape, the gasket according to the invention also contributes in facilitating the centering of the socket end of the one member when this is threaded onto the spigot end of the other jointing member. The friction between the walls of the slits forming the covered sliding surfaces can easily be reduced to a minimum by small amounts of lubrication means.

How the foregoing and other objects and advantages are attained will appear more fully from the following description, reference being had to the accompanying drawings.

BRIEF DESCRIPTION OF THE DRAWINGS

FIG. 4 shows cross sections through a variant of the embodiment of the gasket illustrated in FIGS. 3a and 3b.

FIG. 5 is on larger scale a segment of a cross section through the gaskets of FIG. 4.

DESCRIPTION OF THE PREFERRED EMBODIMENTS

Figure 1:
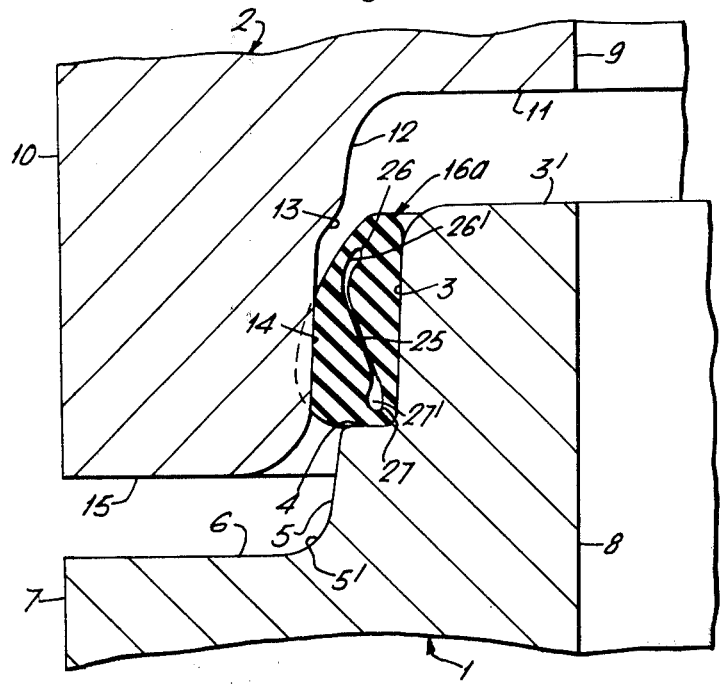
FIG. 1 shows a cross section through a first embodiment of a gasket according to the invention mounted on the spigot end of one of two members to be joined.

Referring to FIG. 1, 1 designates a segment of a section through the spigot end of a pipe- or ring-shaped member. 2 is a segment of a section through the socket end of another pipe- or ring-shaped member which is to be put down or installed on the member 1. The spigot end of the member 1 which for example may be a concrete pipe, a basin ring or similar, is provided with a vertical sealing portion 3 which at the top joins a horizontal abutment surface 3', and which at the bottom via an approximately horizontal shoulder 4 merges into an intermediate portion 5 having a somewhat larger diameter than the portion 3. The intermediate portion 5 merges via a curved transition portion 5' into a substantially horizontal abutment portion 6 which along its outer edge joins the outer wall 7 of the spigot end. In FIG. 1 the inner wall of the member 1 is designated 8.

The other member 2 which for example may be a concrete pipe having a socket which is made to fit the spigot end of the member 1, has an inner wall 9 and an outer wall 10. At its lower end the inner wall 9 merges into a horizontal abutment portion 11 which in turn merges into a first substantially vertical sliding portion 12. Via a curved transition portion 13 the sliding portion 12 joins another substantially vertical sliding portion 14 which in turn merges into another horizontal abutment portion 15. This, in turn, joins the above-mentioned outer wall 10 at its marginal end.

In the area of the vertical sealing portion 3 on the spigot end 1 and the shoulder 4 there is mounted a gasket 16a of rubber or similar, which is to serve for sealing connection between the portions or surfaces 12, 13, 14 on the socket end 10 and the surfaces or portions 3 and 4 on the spigot end 1 when the ends are put together to abut against the above-mentioned abutment portions, i.e. when the portions 11 and 15 on the socket end 2 come to final rest against the portions 3' and 6 respectively on the spigot end 1.

The gasket 16a has a cross section shaped like a drop or a rounded trapezoid and is provided with a closed split-shaped passage 25 extending in the longitudinal direction of the gasket.

The split-shaped passage 25 comprises walls which under an inclined angle extend outwardly from the bottom towards the top. At their upper and lower edges the inclined walls merge into curved portions 26 and 27 respectively defining small spaces 26' and 27' respectively.

The inclined outwardly extending walls of the split-shaped passage 25 allow for a reduction of the thickness of the gasket when portions of the gasket are entrained by the socket end during the installation thereof on the spigot end.

Figure 2:
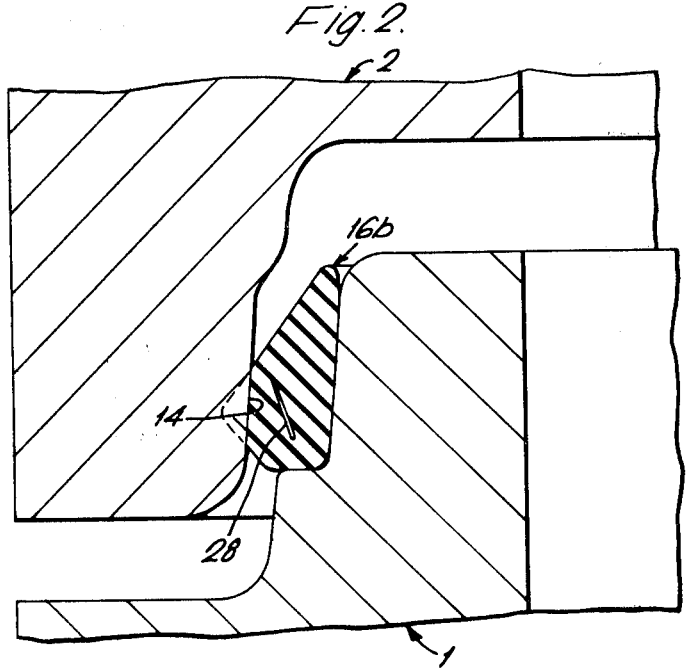
FIG. 2 shows a cross section through another embodiment of the gasket according to the invention.

The gasket illustrated in FIG. 2 can be said be said to be a variant of the gasket according to FIG. 1, the cross section of the gasket 16b in FIG. 2 exhibiting a split-shaped passage 28 having the same effect as the split-shaped passage 25 discussed in connection with the gasket shown in FIG. 1. Otherwise, the gasket 16b has a diamond- or rhomboid cross section, that is, it is given a more wedge-shaped design than the embodiment in FIG. 1.

In both embodiments it is of value that the thickness of the gasket is easily reduced when the portion of the gasket which during the installation of the members is in contact with the sliding surface 14, is pulled downwards thereby. Accordingly, the gasket offers a comparatively small resistance against alterations of its shape when it is subjected to a force in the installation direction. If the members after having gained their final position are displaced in the opposite direction the gasket 16a or 16b will try to increase its thickness to the original dimension. However, due to the narrow shape of the split, this deformation of the gasket will require greater force than is the case during installation, because the gasket portions are clenched.

Figure 3A:
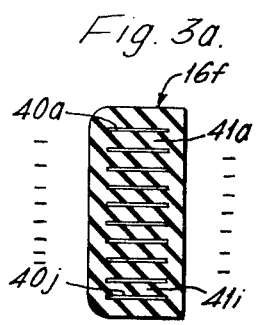
FIG. 3a and 3b show cross sections through a third embodiment of the invention, FIG. 3a illustrating the cross section of the gasket prior to installation of the members to be joined, and FIG. 3b illustrating the cross section during the installation of the said members.
Figure 3B:
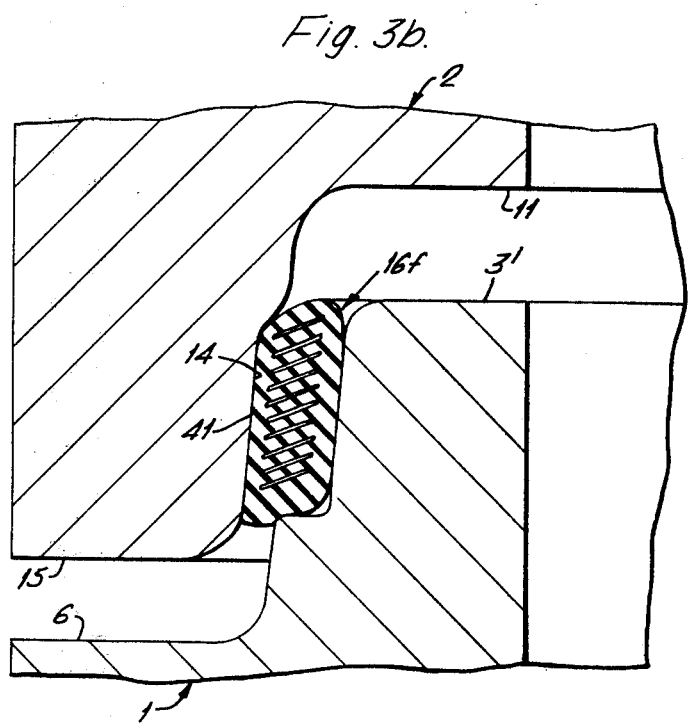

In FIGS. 3a and 3b there is shown a further embodiment 16f which is undeformed condition has an approximately rectangular cross section. The hollow spaces or passages which possibly house an anti-friction means, are in this embodiment defined by a series of parallel very narrow splits 40a–40j extending substantially perpendicularly to the sealing surfaces. The radial thickness of the gasket is somewhat larger than the width of the joint between the two members 1 and 2, but the thickness of the gasket is reduced when its outer surface 41 is stressed in the installation direction because of friction between the sealing surface 14 on the socket part 2 and the outer surface 41. FIG. 3a illustrates the cross section of the gasket prior to installation, whereas FIG. 3b illustrates the gasket during installation, the passages 40a–40j and the intermediate portions or lamellae 41a–41a in the mounting direction taking an outwardly inclined position. The splits 40a–40j are suitably arranged at a spacing which is less than the transverse extension of the splits, a fact which allows an easy reduction of the thickness of the gasket so as to obtain minimum friction when the member 2 is threaded onto the member 1. However, the inherent stiffness in the material of the gasket will induce a return motion of the lamallae 41a–41i, whereby the thickness of the gasket and thereby the gasket pressure will be apt to increase.

It is to be understood that the ratio between the width and the thickness of the lamellae can be regulated within wide limits so that the resilient property of the gasket during installation and the final gasket pressure can be varied correspondingly.

A further advantage of th gasket structure shown in FIGS. 3a and 3b resides in the inclined angle adopted by the lamellae 41a–41i in their installed position, a large locking force between the members 1 and 2 thereby being achieved, because the lamellae have to be clenched before they can turn over their horizontal position. This force is much larger than the force necessary for deflecting the lamellae during the installation operation.

This fact also improves the sealing properties of the gasket, an inner or outer presssure acting upon the surfaces 3', 11' and 6, 15 respectively. If these surfaces are pulled apart as a consequence of the pressure, the lamellae 41a–41i will be clenched. This implies that the packing pressure increases.

In FIGS. 4 and 5 there is illustrated a variant of the embodiment of the gasket discussed in connection with FIGS. 3a and 3b. In FIG. 4 there are illustrated two equal gaskets 42 and 43 respectively, which are inserted in their own inner channel 44 and 45 respectively in an annular socket 46. The gasket 42 is shown in uninfluenced condition or prior to the installation of a first pipe end 47 in the socket 46, whereas the gasket 43 is shown during the installation of a second pipe end 48 in the socket 46. At its center portion the socket 46 is provided with an inner bead 49 which limits the depth of insertion of the pipe ends in the socket.

Similarly to the gasket 16f in FIGS. 3a and 3b the gaskets 42, 43 are provided with a series of parallel slits or splits 50e–50f which over the total length of the gasket extend substantially perpendicularly to the sealing surfaces of the pipe ends and the socket, i.e. transversely to the side surfaces 52, 53 of the gasket, as this is illustrated on a larger scale in FIG. 5. The gaskets 42 and 43 in FIGS. 4 and 5 differ from the gasket in FIGS. 3a and 3b in having a convex end surface 51. Further, the slit or split 50g which is located closest to the convex end surface 51, is given a curved shape. The radius of curvature of the curved end surface 51 and that of the curved slit 50g are approximately equal and may appropriately correspond to approximately two times the mutual distance between the other parallel slits or splits 50a–50f. Toward the side surfaces 52, 53 of the gasket the convex end surface 51 extends outwardly a distance corresponding approximately to the lateral extension of the splits 50a–50f and it merges into inclined outwardly extending lip portions 54, 55, each of which are confined by side surfaces 54a, 54b and 55a, 55b respectively meeting in respective accute angles. The side surfaces 54a and 55a of the lip portions 54 and 55 respectively, which join the convex end surface 51 have a smaller width than the side surfaces 54b and 55b joining the gasket side surfaces 52 and 53 respectively.

The gaskets 42, 43 have the same favourable sealing properties as the gasket 16f in FIGS. 3a and 3b, i.e. they offer a large locking force between the socket 46 and the pipe ends 47, 48, because the lamellae between the splits 50a–50g must be clenched before they can turn over their horizontal position (FIG. 4). In addition, the concave end surface 51 together with the lip portions 54, 55 will offer an increased sealing effect against inner pressure in the pipes 47, 48, because an inner pressure which is effective in the area of the concave end surface 51, will seek to straighten out this surface, a fact which results in the lip portions 54, 55 being pressed firmly against the sealing surfaces of the socket 46 and the pipe ends 47, 48. The larger the inner pressure, the strong the lip portions 54, 55 will be pressed against the said sealing surfaces. It is to be understood that the gaskets are to be mounted with the concave end surface 51 facing the fluid which is to be transported through the pipes. Further it is to be understood that the gaskets according to FIGS. 4 and 5 do not necessarily have to be received in a channel in a socket, but may as well be used in the same manner as illustrated in connection with the other Figures.

It is to be understood that the gasket according to the invention can be used not only in connection with concrete pipes and basins, but also members to be joined of other material, such as plastics. It is further to be understood that the gasket does not have to form closed loops or rings, but can be used in arbitrarily cut lengths, for example as sealing means associated with hatches, etc.

What we claim is:

1. In a gasket of elastomeric material, for use in forming a seal between respective sealing surfaces of two members by relative movement of said sealing surfaces substantially parallel to each other thereby to deform the gasket, by relative displacement of portions thereof, the improvement which comprises:
    (i) those portions of the gasket which are relatively displaced, during said substantially parallel movement, define at least one very narrow slit;
    (ii) the distance between the opposed surfaces bounding said at least one slit is so small that, during said relative displacement, said portions are constantly in contact with each other and slide along each other over at least a part of said surfaces;
    (iii) said at least one slit is so arranged that, during said substantially parallel movement in a first direction for forming said seal, said displaced portions of the gasket do not become bent, whereas any substantially parallel movement in a second direction, opposite to said first direction, causes said portions to become frictionally locked with each other, thereby to offer relatively high resistance to said parallel movement in said second direction, with production of a relatively high packing pressure between said sealing surface.

2. A gasket as defined in claim 1, wherein the gasket takes the form of a drop or diamond, having a thickness which is larger than the width of the joint between the sealing surfaces of the members to be joined, and wherein the slit is a narrow split-shaped passage (27' respectively 28), the walls of which are so inclined relative to the mounting direction that the thickness of the gasket is easily reduced as a result of the sliding of the gasket portions along each other when the gasket is entrained by the member which is displaced relative to the member on which the gasket is located, and wherein the gasket upon displacement of the members in opposite direction of the installation direction seeks to regain its original thickness whilst the gasket portions are clenched.

3. A gasket, as claimed in claim 1, which is thicker, in transverse cross-section, at one longitudinal end than at the other longitudinal end, the thickness of said one longitudinal end being greater than the spacing of the sealing surfaces between which the gasket is to be positioned, said slit being elongated and said opposed surfaces bounding the slit being inclined with respect to the direction of substantially parallel movement such that the sliding of said portions of the gasket during movement in said one direction readily results in reduction of the thickness of the gasket, whereas relative movement in said second opposite direction, with said portions being frictionally locked with each other, causes the gasket to tend to revert to its original thickness.

4. A gasket, as claimed in claim 1, having an approximately rectangular outer cross-sectional shape, the transverse thickness of the gasket being greater than the spacing of the sealing surface between which the gasket is to be positioned, said gasket including a plurality of parallel slits disposed approximately perpendicularly to said sealing surfaces, when the gasket is in position between said surfaces, said slits being defined between intermediate mutually displaceable lamellae, the spacing of the surfaces of adjacent lamellae which bound each slit being not greater than is necessary to permit the lamellae to become inclined to the perpendicular to said sealing surfaces during said relative movement in said first direction, said lamellae remaining during such movement in a relatively linear form and parallel to each other, whereas during movement in said second direction said lamellae become frictionally engaged with and support each other against deformation.

5. A gasket, as claimed in claim 4, wherein the thickness of the lamellae is less than the length of the slits.

6. A gasket, as claimed in claim 4, including lubricant on the opposed surfaces bounding the slit.

7. A gasket, as claimed in claim 4, wherein a longitudinal end of the gasket is convex, and wherein a slit closest to said convex end has a curvature corresponding approximately to the curvature of said convex end.

8. A gasket, as claimed in claim 7, wherein the radius of curvature of the convex end and of the curved slit corresponds approximately to twice the thickness of a lamella.

9. A gasket, as claimed in claim 7, wherein there are provided, at said convex end, respective lip portions extending obliquely from the gasket at each side of said convex end.

10. A gasket, as claimed in claim 9, wherein each lip portion is bounded by a pair of straight side faces which meet at an acute angle, that side face of each lip which merges with the convex end face being of shorter length than the other side face thereof.

* * * * *